Patented July 5, 1949

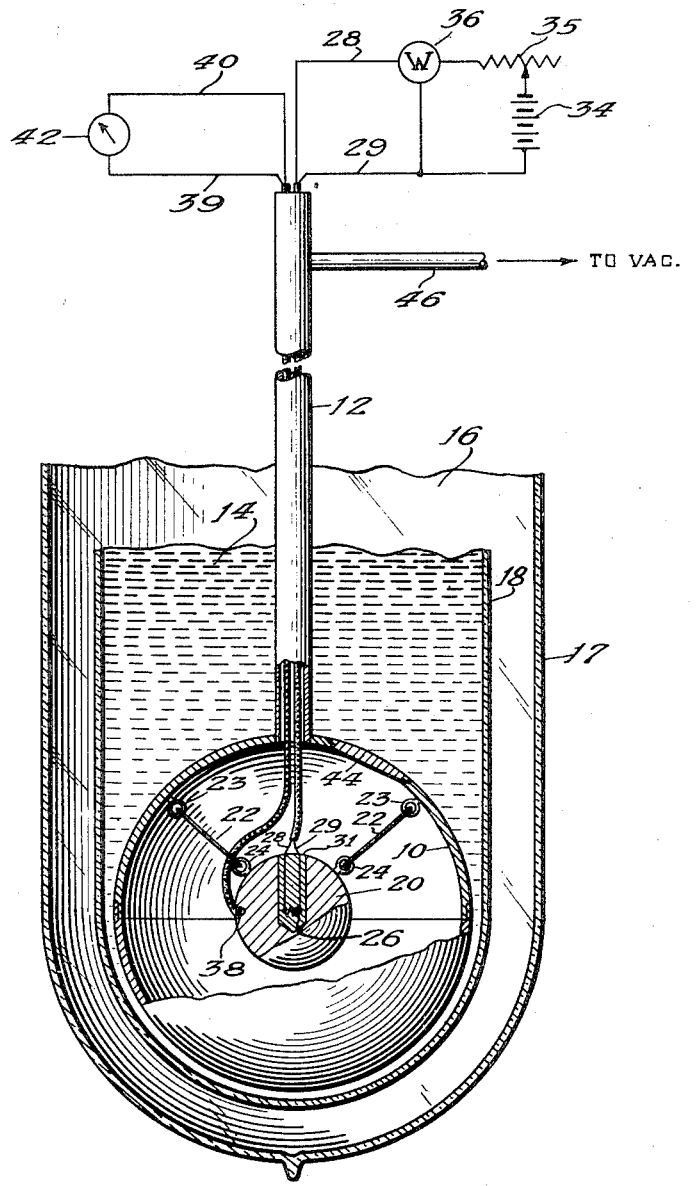

2,475,138

UNITED STATES PATENT OFFICE 2,475,138

DEVICE FOR MEASURING THERMAL CONDUCTIVITY

Charles B. Hood, Jr., Wesley Jones, and Herrick L. Johnston, Columbus, Ohio, assignors to the United States of America as represented by the United States Atomic Energy Commission Application October 30, 1944, Serial No. 561,134

10 Claims. (Cl. 73—15)

Our invention relates to apparatus for measuring the thermal conductivity of various materials and is more particularly directed to such a device capable of very accurate measurement of the thermal conductivity of fluids and of solids that can be handled somewhat as liquids are handled.

The major problem in measuring thermal conductivities lies in the difficulty of causing all the heat supplied to one side of a thickness of material to be tested to flow through that material to a second side or surface without loss.

An object of our invention is to provide a thermal conductivity cell in which substantially all the measured amount of heat supplied to the material being tested flows through that material.

Another object is to provide a thermal conductivity cell in which the temperature gradient through the material being tested will be the same for all similar sections through that material.

A further object is to provide a thermal conductivity cell in which the conductivity may be calculated from temperature readings, heat input and from the geometry of the material being tested without recourse to complicated calibrating techniques.

A further object is to provide a thermal conductivity cell in which the heat flow between two concentric spherical surfaces is easily determined.

Further objects will be apparent from the specification and drawing and from the appended claims.

The single figure of the drawing is a diagrammatic elevational view, partly in section, of a preferred embodiment of a thermal conductivity cell incorporating various features of our invention.

In the thermal conductivity cell illustrated a measured amount of heat is supplied to a spherical surface within a measured period of time. This heat flows through the material being tested to a second spherical surface concentric with the first spherical surface. By measuring the temperatures of each of these surfaces, and knowing the physical dimensions, the thermal conductivity of the material may be calculated.

Referring to the drawing, the thermal conductivity cell includes a relatively thin spherical shell 10 that is suitably secured to a supporting tube 12 and is positioned thereby in a bath 14 of low boiling point liquid. The shell 10 is preferably formed of a metal of high thermal conductivity such as copper, and the tube 12 is preferably formed of a metal of relatively low thermal conductivity such as Monel metal.

A Dewar flask 16, having an outer glass wall 17 and an inner glass wall 18 with the space therebetween evacuated serves as a container for the liquid bath 14. The Dewar flask 16 greatly reduces the heat lost from the liquid bath 14, permits establishment of a uniform and substantially constant temperature adjacent the surface of shell 10 and thus assures an even heat loss from all parts of the surface of the shell 10. Likewise, when the liquid bath 14 is one having a very low boiling point, the Dewar flask prevents rapid loss of the liquid.

Since the shell 10 is of relatively high thermal conductivity and of thin section, it may be assumed that the temperature of the inner surface of the shell 10 is at the boiling point of the liquid bath 14.

A spherical ball 20, preferably of a material of relatively high thermal conductivity such as copper, is supported within the spherical shell 10 by means of threads 22 of a material of very low thermal conductivity such as fishing line. The threads 22 are secured to eyes 23 attached to the shell 10 and by eyes 24 attached to the ball 20. The lengths of the threads 22 are adjusted so that the ball 20 is concentric with the shell 10.

The ball 20 is recessed to receive an electric heater 26 disposed at the center thereof. The heater 26 is supplied with electric current by wires 28 and 29 which are led into the interior of the shell 10 through the tube 12. The heater 26 and the wires 28 and 29 are suitably insulated and the recess in the ball 20 is filled with a low melting point metal 31, such as Woods metal, thereby forming a solid metal sphere with a heater at the center. The wires 28 and 29 are of very low resistance relative to the heater 26 in order that the heating effect of the lead-in wires will be negligible.

The wires 28 and 29 are led out of the upper end of the tube 12 through a suitable pressure seal, and are connected to a suitable source of electric current 34 through a variable resistance 35 and a wattmeter 36. It will be apparent that adjustment of the resistance 35 will vary the quantity of current supplied to the heater 26 and that any value of power selected will be indicated by the wattmeter 36.

A thermocouple 38 is imbedded in the surface of the ball 20. Lead wires 39 and 40 are carried through the tube 12, and through a suitable pressure seal in the upper end of the tube 12 to connect the thermocouple to a galvanometer 42 which may be calibrated in degrees corresponding to the temperature of the surface of the ball 20. It may be desirable to provide a plurality of thermocouples disposed at various points on the surface of the ball 20 if it is found that any temperature variation exists on the surface of the ball.

The material, the thermal conductivity of which is to be tested, is placed in the space between the shell 10 and the ball 20 by removing a plate 44 which fits an opening in the upper part of the shell 10 adjacent the tube 12. It is desirable to provide a gasket seal around the periphery of the plate 44 in order that the liquid of the bath 14 will not enter the shell 10. The material to be tested should just fill the shell 10 but should not enter the tube 12 to an appreciable extent.

In order to reduce the heat lost through the tube 12, a vacuum connection 46 is provided in the upper end of the tube 12. By removing air or other gases from the tube 12, conduction and convection in the tube may be reduced to a negligible value. As previously pointed out, the tube 12 is made of a material having relatively low thermal conductivity and is sufficiently long so that little heat is lost therethrough. Also the diameter of the tube 12 is so small in proportion to the surface area of the shell 10 that heat lost therethrough comprises a negligible part of the total heat flow.

Initial evacuation of the interior of the shell 10 is also advantageous when it is desired to measure the thermal conductivity of a gas. By first evacuating the interior of the shell 10 it is possible to admit the gas to be tested at the desired pressure.

Likewise it is desirable to evacuate the shell 10 when some solids are being tested, as for instance, substances that are hygroscopic.

The liquid bath 14 may be changed in accordance with the desired temperature to be maintained on the surface of the shell 10, by selecting a liquid with the desired boiling point. Also the bath may be a liquid with a solid of a desired melting point added thereto. A bath of distilled water and cracked ice will maintain the shell 10 at 0° C. If desired, a liquid may be used and the temperature observed by means of a thermometer.

In operation, the material to be tested is placed in the shell 10. The vacuum may be applied if desired or necessary to ensure constant conditions before or after the shell 10 is placed in the bath 14. Electric current is applied to the heater 26. The temperature reading of the galvanometer 42 is observed and when a constant temperature value is reached such that the liquid of bath 14 is at a constant temperature such as its boiling point, the value of the heat input within a measured period of time is observed on the wattmeter 36. The temperature of the shell 10 is determined by observing the temperature of the liquid bath 14. The temperature of the surface of the ball 20 is indicated by the galvanometer 42. It is then possible to calculate the thermal conductivity of the material being tested in accordance with Fourier's law from this data together with the data respecting the dimensions and spacing of the spherical shell 10 and the spherical ball 20.

The device may also be calibrated by noting the various values of temperature and power while testing a material the thermal conductivity of which has been determined very accurately.

While only a single embodiment of our invention has been shown and described, various modifications will occur to those skilled in the art and it is therefore understood that the scope of our invention is to be limited only by the appended claims.

We claim:

1. In a thermal conductivity cell, in combination, a first spherically shaped body, a second spherically shaped body having an opening sealed by a closure and surrounding said first body and spaced therefrom to provide a receptacle therebetween for a material to be tested, said spherically shaped bodies being substantially concentric, means for supplying heat to said first body, means for measuring the amount of heat supplied, means for maintaining said second body at a substantially fixed temperature, and means for measuring the surface temperature of said first body.

2. In a thermal conductivity cell, in combination, a spherical shell of relatively high thermal conductivity having an opening sealed by a closure, means for maintaining the temperature of the shell area substantially uniform, a ball suspended concentrically within said shell, a heater within said ball, and means for measuring the surface temperature of said ball.

3. In a thermal conductivity cell, in combination, a spherical shell of relatively high thermal conductivity having an opening sealed by a closure and immersed in a constant temperature bath, threads of low thermal conductivity interconnecting said shell and said ball and locating said ball substantially concentrically within said shell, a heater within said ball, and means for measuring the surface temperature of said ball.

4. In a thermal conductivity cell, in combination, a spherical shell of relatively high thermal conductivity having an opening sealed by a closure and immersed in a constant temperature bath, a ball suspended concentrically within said shell, a heater within said ball, means for measuring the amount of heat supplied by said heater, and means for measuring the surface temperature of said ball.

5. In a thermal conductivity cell, in combination, a first spherically shaped body, a second spherically shaped body having an opening sealed by a closure and surrounding said first body and spaced theerfrom to provide a receptacle therebetween for a material to be tested, said spherically shaped bodies being substantially concentric, an electric heater imbedded in said first body at approximately the center thereof, means for measuring the power supplied to said heater, a constant temperature bath surrounding said second body, and thermocouple means to measure the temperature at a point on the surface of said first body.

6. In a thermal conductivity cell, in combination, a first spherically shaped body, a second spherically shaped body having an opening sealed by a closure and surrounding said first body and spaced therefrom to provide a receptacle for a material to be tested, said spherically shaped bodies being substantially concentric, an electric heater imbedded in said first body at approximately the center thereof, means for measuring the power supplied to said heater, means for stabilizing the temperature of said second body, and a thermocouple imbedded in said first body responsive to the temperature of the surface thereof.

7. In a thermal conductivity cell, in combination, a first spherically shaped body, a second spherically shaped body having an opening sealed by a closure and surrounding said first body and spaced therefrom to provide a receptacle for a material to be tested, said spherically shaped bodies being substantially concentric, an electric heater imbedded in said first body at approximately the center thereof, means for measuring the power supplied to said heater, a constant temperature bath surrounding said second body, thermocouple means to measure the temperature at a point on the surface of said first body, and a supporting tube for said second body opening into the interior thereof to provide a conduit for wires communicating with said heater and said thermocouple.

8. In a thermal conductivity cell, in combination, a first spherically shaped body, a second spherically shaped body having an opening sealed by a closure and surrounding said first body and spaced therefrom to provide a receptacle for a material to be tested, said spherically shaped bodies being substantially concentric, an electric heater imbedded in said first body at approximately the center thereof, means for measuring the power supplied to said heater, a constant temperature bath surrounding said body, thermocouple means to measure the temperature at a point on the surface of said first body, a supporting tube opening into the interior of said second body to provide a conduit for wires communicating with said heater and said thermocouple, and means associated with said tube for connecting said tube to pressure reducing means.

9. A thermal conductivity cell comprising a pair of concentrically spaced spherically shaped bodies, the inner of said bodies being provided with heat supplying means and with means for measuring the surface temperature thereof and the outer of said bodies having an opening sealed by a closure.

10. A thermal conductivity cell comprising a pair of concentrically spaced spherically shaped bodies, the inner of said bodies being provided with heat supplying means and with means for measuring the surface temperature thereof, and the outer body having a portion thereof removable for changing the contents of the space between said bodies.

CHARLES B. HOOD, JR.
WESLEY JONES.
HERRICK L. JOHNSTON.

REFERENCES CITED

The following references are of record in the file of this patent:

UNITED STATES PATENTS

| Number | Name | Date |
|---|---|---|
| 1,274,635 | Tschudy | Aug. 6, 1918 |
| 1,506,003 | Kambayashi | Aug. 26, 1924 |
| 1,768,415 | Matunaga | June 24, 1930 |

FOREIGN PATENTS

| Number | Country | Date |
|---|---|---|
| 458,927 | Germany | Apr. 23, 1928 |